United States Patent [19]
Okuda et al.

[11] Patent Number: 5,089,743
[45] Date of Patent: Feb. 18, 1992

[54] PROJECTION CATHODE RAY TUBE

[75] Inventors: Hiroshi Okuda; Yasuo Iwasaki, both of Nagaokakyo, Japan

[73] Assignee: Mitsubishi Denki Kabushiki Kaisha, Kyoto, Japan

[21] Appl. No.: 596,922

[22] Filed: Oct. 12, 1990

[30] Foreign Application Priority Data

Oct. 16, 1989 [JP] Japan ................. 1-269763

[51] Int. Cl.$^5$ .................... H01J 29/10; G02B 5/22
[52] U.S. Cl. .................... 313/474; 313/466; 313/468; 358/253; 359/580; 359/589; 359/359
[58] Field of Search ............ 313/474, 468, 466; 358/253, 237; 350/164, 166, 1.6

[56] References Cited

U.S. PATENT DOCUMENTS

| | | | |
|---|---|---|---|
| 4,634,926 | 1/1987 | Vriens et al. | 313/474 |
| 4,642,695 | 2/1987 | Iwasaki | 358/237 |
| 4,683,398 | 7/1987 | Vriens et al. | 313/474 |
| 4,937,661 | 6/1990 | van der Voort | 313/474 |
| 4,990,824 | 2/1991 | Vriens et al. | 358/253 |

FOREIGN PATENT DOCUMENTS

| | | |
|---|---|---|
| 39349 | 2/1986 | Japan . |
| 273837 | 12/1986 | Japan . |

Primary Examiner—Donald J. Yusko
Assistant Examiner—Diab Hamadi

[57] ABSTRACT

A cathode ray tube for producing images in red, green or blue is used for a projection type television set. A multi-layered interference filter is disposed between a face glass and a fluroescent layer so as to gather light beams from the fluorescent layer. The innermost layer of the interference layer is made of a high refractive index material such as tantalum pentaoxide which is resistant to hydrofluoric acid, so that a fluorescent material can be applied as efficiently as possible. The innermost layer of the interference filter has the optical distance expressed by the equation:

$$nd = (2m+1)\lambda_h/4$$

$$\lambda_h = \lambda + \lambda_p$$

where n stands for the refractive index of the layer, d stands for thickness of the layer, m stands for an integer larger than 0, $\lambda_h$ is the cutoff wavelength of the optical spectrum transmissitivity of the multi-layered interference film for yielding a transmissivity of fifty percent and $\lambda_p$ is 20 to 100 nm. The innermost layer is made thick so as to be resistant to hydrofluoric acid.

5 Claims, 3 Drawing Sheets

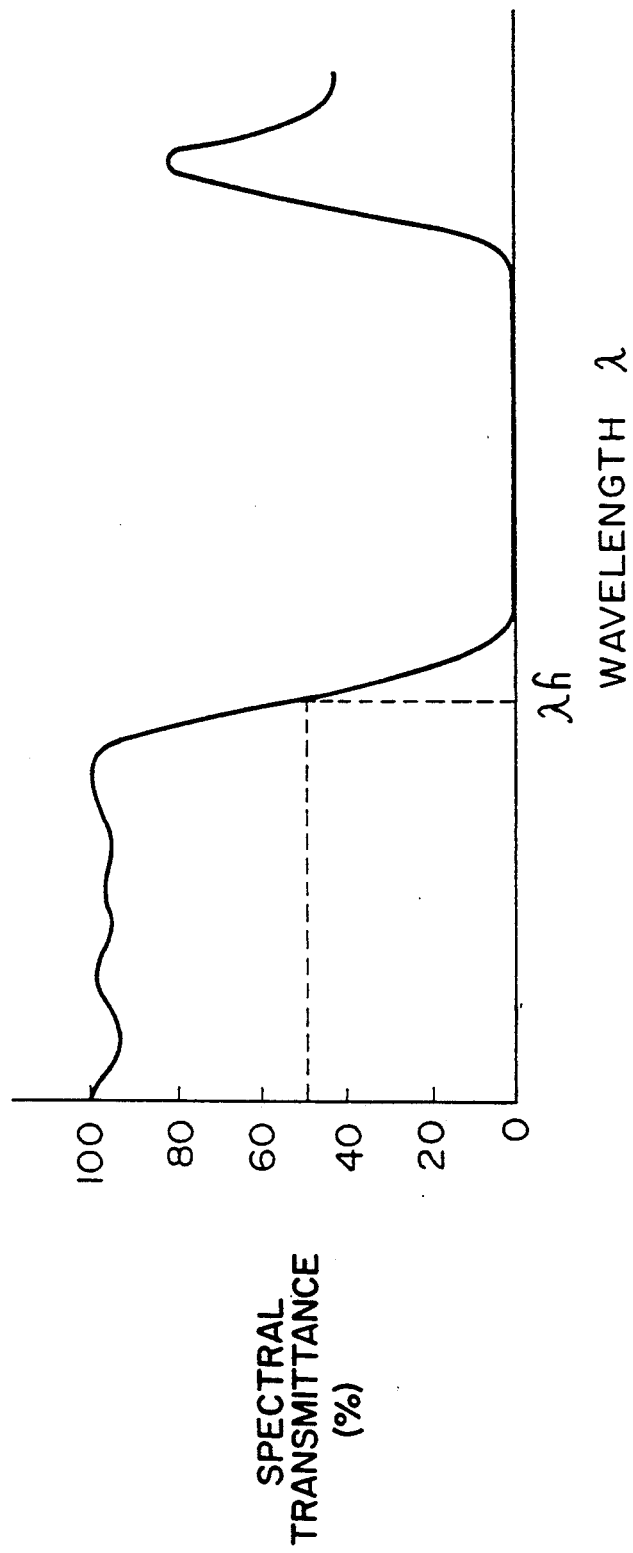

PROJECTION CATHODE RAY TUBE

BACKGROUND OF THE INVENTION

1. Field of the Invention

This invention relates to a projection cathode ray tube in which an image is produced on a fluorescent layer and is projected on a screen on an enlarged scale through projecting lenses.

2. Description of the Related Art

U.S. Pat. No. 4,642,695 exemplifies a cathode ray tube which has been devised so as to improve low efficiency in gathering light beams into projection lenses from monochromatic cathode ray tubes in a projection type television set.

With an ordinary cathode ray tube, the light beams produced on the fluorescent layer have substantially complete divergence. On the contrary, with a projection type television set, only light beams that are produced on the fluorescent layer and have a divergent angle of 30° or less are used, while the other light beams are not used. The above cited reference discloses that brightness of the image on the projection type television screen is much improved when more than 30% of the light beams produced from a certain luminescent point on the fluorescent layer is converged into the inside of a cone having the divergent angle of ±30°.

Japanese Patent Laid-Open Publication No. 273837/1986 exemplifies a projection cathode ray tube including a multi-layered interference filter, which is made of a high refractive index material and a low refractive index material superimposed one after another between an inner side of a face glass and a fluorescent layer. Tantalum pentaoxide ($Ta_2O_5$) or titanium oxide ($TiO_2$) is used as a high refractive index material, while silicon dioxide ($SiO_2$) or magnesium fluoride ($MgF_2$) is used as a low refractive index material. The interference filter contains more than five layers of the high and low refractive index materials superimposed one after another.

With the above cathode ray tubes, the optical distance nd of each layer (the letters n and d represent the refractive index and the thickness of the layer material) is 0.2 to 0.3 $\lambda_f$, preferably 0.23 to 0.25 $\lambda_f$ in the cathode ray tube described in the above Japanese Reference (where $\lambda_f = p \times \lambda$: $\lambda$ stands for the central wavelength to be selected according to the luminous spectrum of the fluorescent material; p is a value between 1.18 and 1.32). Preferably the optical distance should be approximately $\lambda_f/4$.

It is usually necessary to wash the inner surface of the face glass prior to applying a fluorescent material to the face glass. Hydrofluoric acid (HF) having a density of several per cent is used for this purpose.

Further, if the face glass suffers from an inconvenience such as peeling of the fluorescent material, film or evaporated aluminum, or roughened surface, the fluorescent layer is removed by a process referred to as a salvaging process, thereby recycling the glass material.

However one layer of the interference filter of the conventional projection cathode ray tube is very thin, i.e., about 1000 to 2000 Å thick. When the face glass were washed with hydrofluoric acid, interference filter layers would peel off. Therefore such face glass is washed only by water or detergent. The face glass which is not washed with hydrofluoric acid has been problematic in that it suffers from peeling fluorescent materials or dusts. It is also disadvantageous that the glass material cannot be reused since it cannot be subject to the salvaging process.

SUMMARY OF THE INVENTION

It is therefore an object of this invention to provide a projection cathode ray tube including a multi-layered interference filter which does not peel during the hydrofluoric acid washing process so as to reduce defective fluorescent layers, and can withstand the salvaging process including the hydrofluoric acid washing, so that the material of the face glass can be recycled.

According to this invention, there is provided a projection cathode ray tube including a face glass and an interference filter which is disposed between a face glass and a fluorescent layer on an inner surface of the face glass. The interference filter comprises a multi-layered structure composed of alternately superimposed layers having high refractive index and low refractive index. The innermost layer of the interference filter is made of a high refractive index material in contact with the fluorescent layer and has an optical distance nd expressed by the following equations:

$$nd = (2m+1)\lambda_h/4$$

$$\lambda_h = \lambda + \lambda_p$$

where the letter n stands for the refractive index of a layer; d stands for thickness of the layer; m stands for an integer larger than 0; $\lambda$ stands for a desired central wavelength selected based on luminescent spectrum; and $\lambda_p$ is a desired wavelength in the range of 20 to 100 nm. Further $\lambda_h$, as will be described subsequently with regard to FIG. 3, is the cut-off wavelength of optical spectrum transmissivity of the multilayered interference film, for yielding a transmissivity of 50%. The innermost layer in contact with the fluorescent surface is the thickest of all the interference filter layers, and is made of a high refractive index material such as tantalum pentaoxide, titanium oxide, niobium penta-oxide, or zinc sulfide. The multi-layered interference filter described above is resistant to hydrofluoric acid.

BRIEF DESCRIPTION OF THE DRAWINGS

FIG. 3 shows a graph representing special transmittance of the multiple-layered interference filter, where $\lambda_h$ stands for a cut-off wavelength when the transmissivity is 50%.

DETAILED DESCRIPTION

Figure 1:
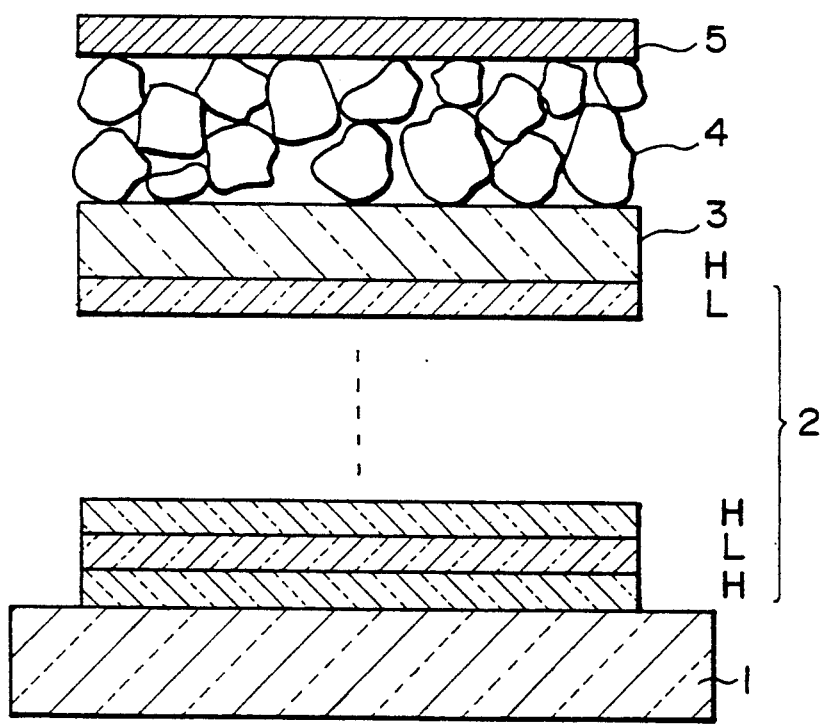
FIG. 1 is a cross-sectional view of a projection cathode ray tube embodying this invention.

The principles of this invention are particularly useful when embodied in a cathode ray tube such as shown in FIG. 1, which is a cross-sectional view of a face glass of the cathode ray tube having an interference filter of a multi-layered structure. In FIG. 1, reference numeral 1 designates a face glass, and 2 designates an interference filter, which has an optical distance $\lambda_h/4$ (where $\lambda_h = \lambda_p + \lambda$; $\lambda$ represents a desired central wavelength selected according to the luminous spectrum of a fluorescent material; $\lambda_p$ is within the range of 20 and 100 nm). Letters H and L respectively stand for layers of a high refractive index material, and those of a low refractive index material. Reference numeral 3 designates a layer of a high refractive index material having the optical distance of 3 $\lambda_h/4$ ($\lambda_h$ is the same as that described above); 4, a fluorescent layer; and 5, an aluminum film for reflecting the light scattered on the opposite side of the face glass.

Figure 2:
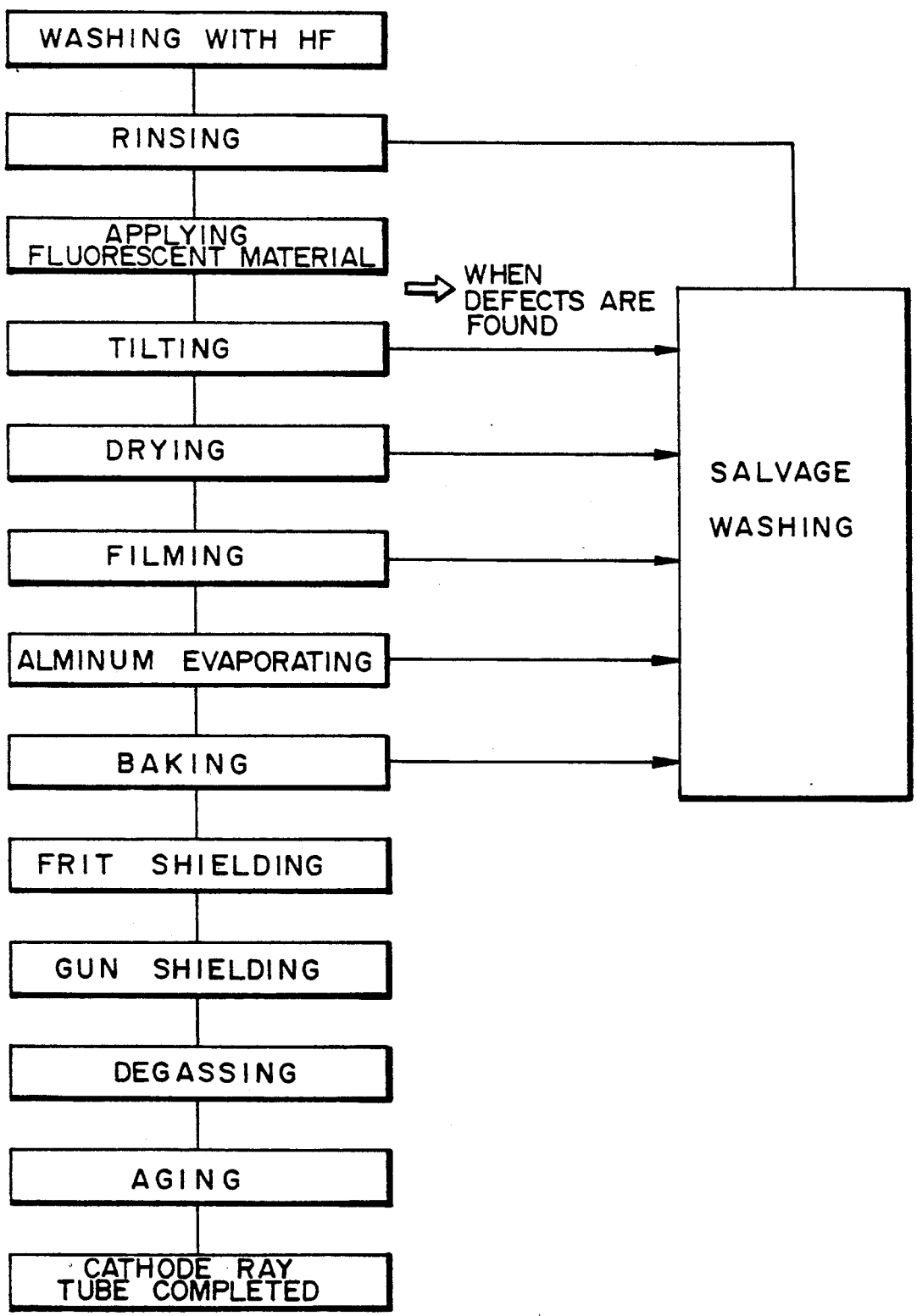
FIG. 2 shows a flow chart representing a process for manufacturing the projection cathode ray tube.

A first sample of the cathode ray tube was manufactured according to the embodiment of this invention as mentioned below. First, a fluorescent layer was activated by terbium. A multi-layered interference filter includes a total of thirteen layers of tantalum pentaoxide (Ta$_2$O$_5$) and silicon dioxide (SiO$_2$), and has 600-nm $\lambda_h$. The optical distance of the innermost layer of the interference filter is 3 $\lambda_h/4$. The multi-layered interference filter can withstand washing with hydro-fluoric acid (at HF density of 5%, for 30 seconds) which is used to wash cathode ray tubes without interference filters. In addition, the sample interference filter was free from cracks or peeling even after it was subjected to the salvage washing as shown in FIG. 2 (for example, the filter was washed in sodium hydroxide NaOH of 5% for 5 seconds, and then rinsed with water, washed in 7% hydrofluride acid for 60 seconds, and then rinsed with water). When compared with a cathode ray tube without an interference filter, the sample cathode ray tube could improve the brightness by 160 to 180% in the direction normal to the face glass. In addition, gradation and contrast of the colors have been greatly improved by the use of the interference filter.

Conventionally, the thickness of all the layers composing the interference filter was designed to be substantially equal to a quarter of the wavelength of the light beams to be transmitted therethrough, as exemplified in Japanese Patent Laid-Open Publication No. 273837/1986.

In such a case, each layer of the interference filter is about 1000 to 2000 Å thick. Since it is very thin, each layer is microscopically porous (with very minute faults formed). Therefore, even if the outermost layer is made of a material having a strong resistivity to hydrofluoric acid, hydrofluoric acid might infiltrate, via these minute faults, into a layer (made of silicon dioxide having a low refractive index, for example) adjacent to the outermost layer, causing filter layers to peel off.

Magnesium fluoride (MgF$_2$) is known as a low refractive index material in addition to the abovementioned silicon dioxide. However since the magnesium fluoride layer cracks while it is thermally processed, practically silicon dioxide has been solely employed for the cathode ray tubes.

The first sample of the cathode ray tube of the invention includes the multi-layered interference filter whose innermost layer has the optical distance of 3 $\lambda_h/4$ so as be prevent presence of the minute pores and to be very resistant to hydrofluoric acid.

It has been confirmed that the optical distance of 3 $\lambda_h/4$ of the innermost layer is very effective to improve transmittivity of light beams produced on the fluorescent layer and to enable the cathode ray tube to show very good luminous intensity distribution.

British Patent No. 1,306,335 exemplifies an interference filter having twelve layers, three of which are made of a low refractive index material whose optical distance is 1.5 times as long as the wavelength of transmitting light beams, and the other layers which are composed of alternately superimposed high and low refractive index materials. However Japanese Patent Laid-Open publication No. 39349/1986 states that the multi-layered interference filter of British Patent No. 1,306,335 has a unfavorably wide transmitting band for light beams having a wide angle with respect to a normal perpendicular to the multi-layered interference filter.

The first sample of the cathode ray tube includes the interference filter, of which innermost layer is made of a high refractive index material and has the optical distance of 3 $\lambda_h/4$. It has been confirmed that the cathode ray tube can demonstrate very good luminous intensity distribution.

Next, a second sample of the cathode ray tube will be described hereinafter.

A fluorescent layer was activated with terbium similarly to the first sample cathode ray tube. For a green fluorescent material having $\lambda$ of 544 to 545 nm, a multi-layered interference filter includes a total of seven layers of titanium oxide (TiO$_2$) and silicon dioxide (SiO$_2$). These layers have $\lambda_h$ of 640 to 645 nm. The innermost layer of the interference filter is titanium oxide (TiO$_2$) and has the optical distance 3 $\lambda_h/4$.

A third sample of the cathode ray tube was also produced as described above. A multi-layered interference filter includes a total of 21 layers made of tantalum pentaoxide (Ta$_2$O$_5$) and silicon dioxide (SiO$_2$), and has $\lambda_h$ of 565 to 570 nm. The most interior layer of the interference filter is tantalum pentaoxide (Ta$_2$O$_5$) and has the optical distance of 3 $\lambda_h/4$.

With each of the foregoing samples, $\lambda_p$ is 20 to 100 nm, which should be determined according to the number of layers of the interference filter. This is because the characteristics of the sharp cut filter vary with the number of the layers. The more the layers, the sharper the filter cuts light beams. For example, with the interference filter having seven layers in the second sample, $\lambda_h$ is far from the main wavelength of light beams produced on the fluorescent material, because the transmittivity decreases gradually, and the smaller $\lambda_p$, the more probable that the main wavelength of the light beams produced on the fluorescent material would be cut.

It has been confirmed that the second and third samples of the cathode ray tubes have increased brightness by 160 to 180% in the direction normal to the face glass compared with projection cathode ray tubes without interference filters. In addition, the cathode rays tubes of these samples demonstrate improved color gradation and contrast. The multi-layered interference filter is very resistant to hydrofluoric acid.

In the foregoing samples, the green fluorescent material was activated by terbium. Similarly the blue and red fluorescent materials will be used by selecting $\lambda_h$ according to the main wavelength of light beams produced on the fluorescent materials. When the most interior layer of the interference filter is made of a high refractive index material and has the optical distance of 3 $\lambda_h/4$, the cathode ray tube can demonstrate such characteristics as those described with reference to the first to third samples of the cathode ray tubes.

The optical distance of the innermost layer of the filter is described to be 3 $\lambda_h/4$, but may be $(2m+1)\lambda_h/4$ (where m is an integer larger than 0) which is optically equal to the former. The innermost layer should be preferably thick when resistance to hydrofluoric acid is taken into consideration.

What is claimed is:

1. A projection cathode ray tube comprising:
a face glass: and an interference filter disposed between the face glass and a fluorescent layer on an inner surface of said face glass, said interference filter including a multi-layered structure composed of alternately superimposed layers having a high refractive index and a low refractive index, the layer of said interference filter being innermost and in contact with said fluorescent layer, being made of a high refractive index material and having an optical distance nd expressed by the following equation:

$$nd = (2m+1)\lambda_h/4$$

$$\lambda_h = \lambda + \lambda_p$$

where the letter n stands for the refractive index of the layer, d stands for thickness of the layer, m stands for an integer larger than 0, $\lambda$ stands for a desired central wavelength selected based on luminescent spectrum, $\lambda_h$ is a cutoff wavelength of an optical spectrum transmissivity of the interference filter yielding a transmissivity of fifty percent and $\lambda_p$ is a desired wavelength ranging from 20 to 100 nm.

2. A projection cathode ray tube according to claim 1, wherein a high refractive index material used as the innermost layer of said interference filter is tantalum pentaoxide.

3. A projection cathode ray tube according to claim 1, wherein a high refractive index material used as the innermost layer of said interference filter is titanium oxide.

4. A projection cathode ray tube according to claim 1, wherein a high refractive index material used as the innermost layer of said interference filter is niobium pentaoxide.

5. A projection cathode ray tube according to claim 1, wherein a high refractive index material used as the innermost layer of said interference filter is zinc sulfide.

* * * * *